INVENTOR.
Robert W. Montgomery
BY
Lloyd M. Keighley.
HIS ATTORNEY

May 5, 1964

R. W. MONTGOMERY 3,132,231

DOMESTIC OVEN APPLIANCE

Filed May 21, 1962

INVENTOR.
Robert W. Montgomery
BY
Lloyd M. Keighley
HIS ATTORNEY

United States Patent Office 3,132,231
Patented May 5, 1964

3,132,231
DOMESTIC OVEN APPLIANCE
Robert W. Montgomery, Burlingame, Calif., assignor to General Motors Corporation, Detroit, Mich., a corporation of Delaware
Filed May 21, 1962, Ser. No. 196,364
4 Claims. (Cl. 219—35)

This invention relates to domestic appliances and particularly to a cooking structure or oven.

It is known that swingable oven doors on a cooking range or cabinet structure create objections. Such doors are opened several times during the period the oven is employed to bake or roast food products therein to permit a housewife to inspect a roast, to frequently baste same and to add to the roaster receptacle containing meat being roasted other foods such as potatoes, carrots or the like to be cooked with the roast. The opened range cabinet door usually forms an obstruction at the front of the oven which hinders the housewife's accessibility thereto and to the roaster container therein. It is also known and well recognized that cleaning the walls of the interior of an oven is a tedious, annoying and disliked procedure involved in housework. This is true even in an oven equipped with a removable liner since the housewife encounters unpleasant, troublesome and time consuming tasks of being assured that the liner is properly relocated in the oven. In consideration of these objections I contemplate the combining of an oven door swingable in a unique fashion with an oven liner movable thereby which overcomes problems presented so as to furnish a cooking range cabinet structure having a novel combination for meeting a housewife's desideratums and increasing versatility in the use of an oven therein.

An object of my invention is to provide an oven with a liner member supported therein for gliding movement outwardly thereof in response to swinging a door normally closing an access opening of the oven into open position.

Another object of my invention is to hinge an oven door inwardly of the front of a cabinet or oven structure so that an opening movement of the door will shift at least a portion thereof into walls of the cabinet beyond a wall of the oven therein and will simultaneously glide an oven liner out of the oven.

A further object of my invention is to provide an oven with a liner movably supported therein, a door for the oven access opening and a force multiplying link and lever connecting mechanism between the door and liner to glide the liner part-way out of the oven through its access opening with a minimum of effort when the door is opened and while the liner is supported from within the oven.

A still further and more specific object of my invention is to provide a cabinet having an oven therein with a door, a part of which swings inwardly of walls of the cabinet into a compartment below the oven as the door is opened and simultaneously glides a liner within the oven outwardly thereo for causing approximately equal protrusion of both the front edge portion of the oven liner and an edge of the opened door forwardly of the cabinet in substantially a common vertical plane in front of the cabinet to facilitate access to the interior of the oven liner.

Further objects and advantages of the present invention will be apparent from the following description, reference being had to the accompanying drawings wherein a preferred embodiment of the present invention is clearly shown.

Figures 1, 2:
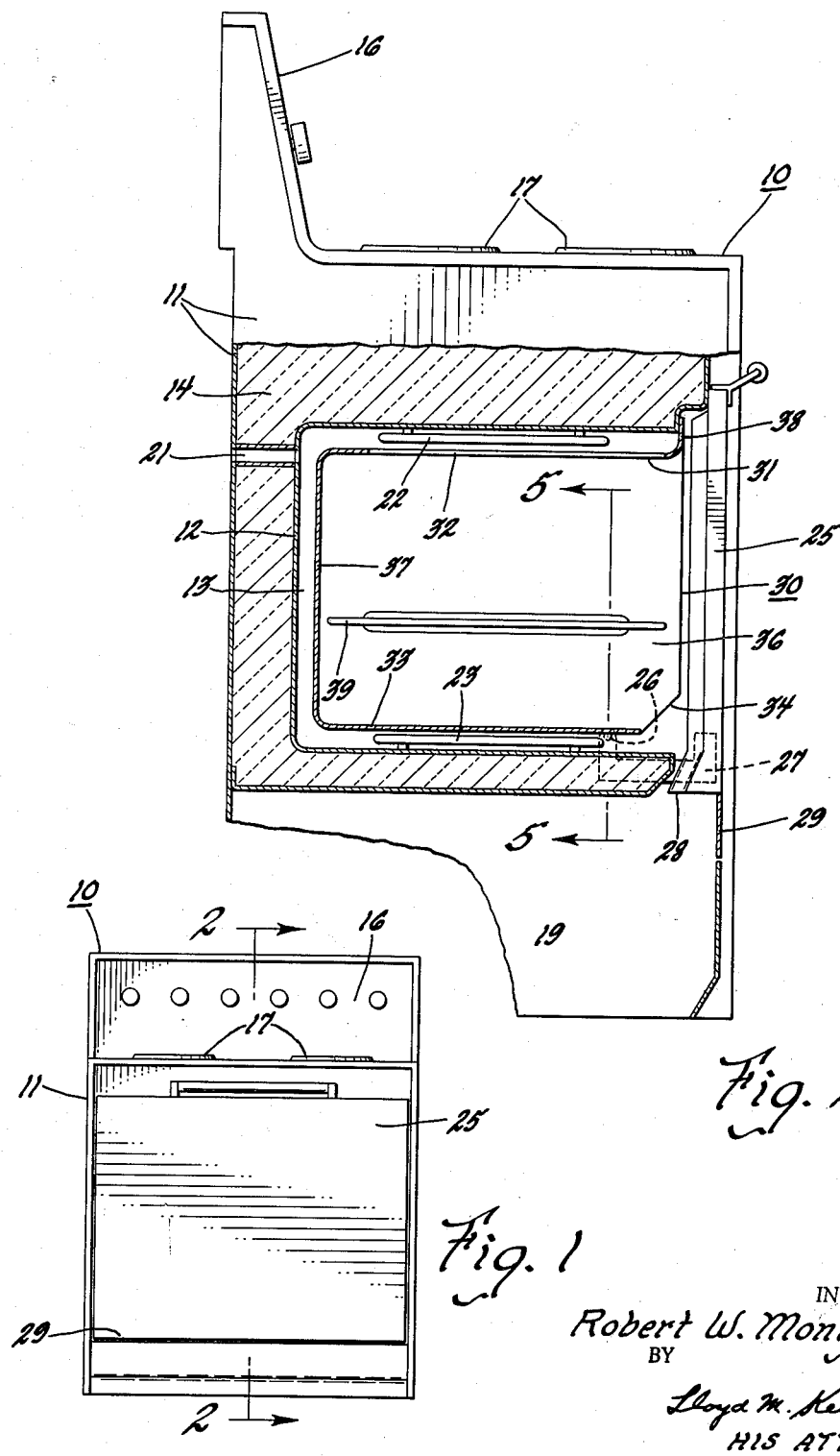
FIGURE 1 is a front elevational view of a cabinet or range structure having a cooking oven therein provided with a liner movable by the oven door in accordance with the present invention.
FIGURE 2 is an enlarged elevational view partly in vertical section taken on the line 2—2 of FIGURE 1 with a portion of the cabinet shown in elevation.
Figure 3:
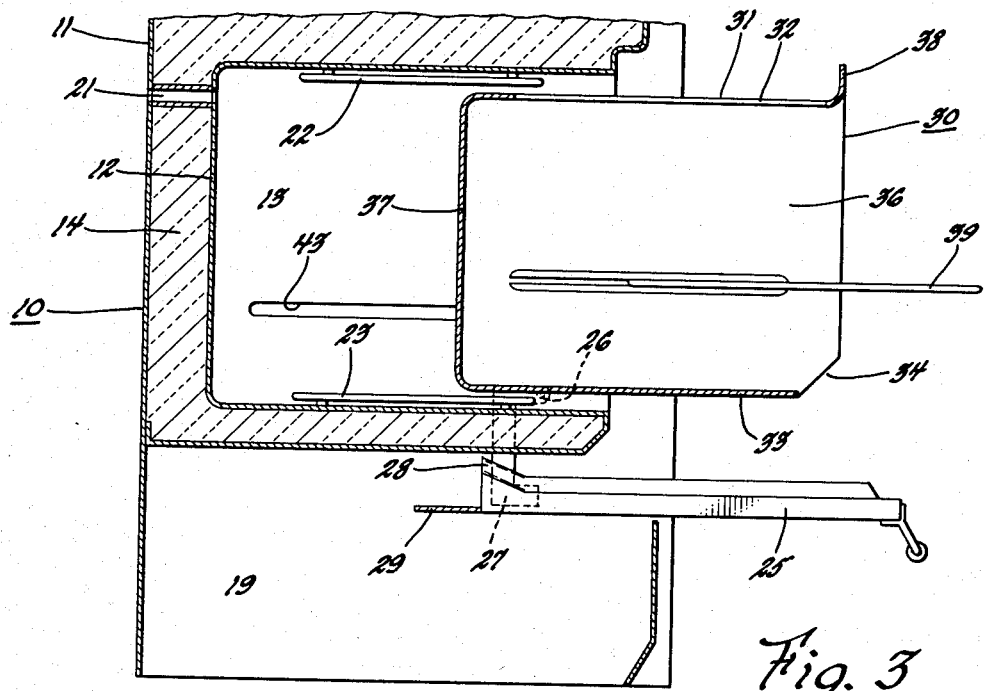
FIGURE 3 is a fragmentary view similar to FIGURE showing the oven door opened and an oven liner glided part way out of the oven.
Figure 5:
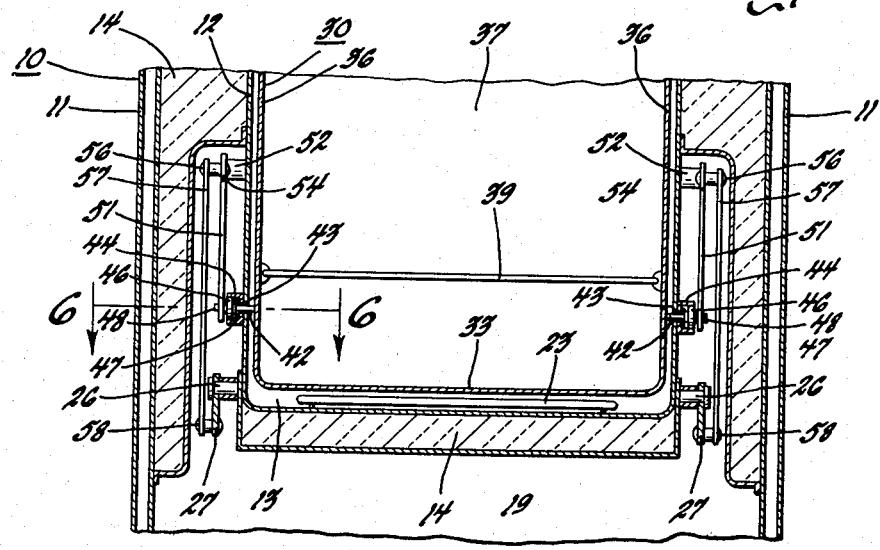
FIGURE 5 is a fragmentary sectional view taken on the line 5—5 of FIGURE 2 showing the mounting of the oven door on walls of the cabinet inwardly of the front thereof.

Referring to the drawings, for illustrating my invention, I show in FIGURE 1 thereof a cooking cabinet or range structure 10 having a plurality of outer metal walls 11 and a shell 12 therein defining a chamber or oven 13 in the structure (see FIGURE 2) with suitable insulating material 14 disposed between walls 11 and walls of the shell 12. The range structure is provided with the usual or conventional combined backsplash and instrument control panel 16 behind the flat top thereof in which electric surface heating cooking units 17 exposed thereat are embedded. Walls 11 of the range or cabinet depend below oven 13 to define a compartment 19 beneath the oven having an aperture in its front normally closed in a manner to be presently described. Oven 13 is provided with a front opening, a vent 21 and one or more upper and lower electrically energizable resistance heater elements 22 and 23 respectively stationarily secured therein in any suitable or conventional fashion as is common and well known in the art for heating the interior of the oven. The opening of oven 13 is normally closed by an insulated door structure 25 hingedly or pivotally mounted upon cabinet 10, as at 26, by substantially U-shaped side arms 27 secured to and extending from the door. It is to be noted (see FIGURES 2, 3 and 5) that the pivot or hinge pins 26 for door 25 are each secured to a wall of cabinet 10, oven shell 12, at points spaced a substantial distance inwardly from the front of the cabinet. The oven door 25 is provided with an inwardly directed lip 28 along its lower edge portion that fits into and substantially fills an angular cut-away front portion of the bottom wall of oven 13 about which the door is adapted to rotate. Door 25 also has a panel 29 thereon (see FIGURES 1, 2 and 3) extending from its lower edge portion that is movable or swingable therewith and which normally closes the open aperture in the front wall of compartment 19. Panel 29 may, insofar as the purpose thereof is concerned, be rigidly formed on door 25 as an integral extension thereof or it may be hinged or otherwise suitably attached thereto. It will be noted that the part of oven shell 12 adjacent the oven opening inwardly thereof from the portion engaged or abutted by door 25 is provided with an indentation which extends along the top and upright sides of the oven opening for a purpose to hereinafter be described. A unitary box-like metal member, generally represented at 30, is movably supported within oven chamber 13 and forms an inner liner therefor. The liner 30 is to be distinguished from an open frame shelf rack in that it is comprised of walls certain of which extend continuously from front to rear of oven chamber 13. Member or liner 30 is provided with a partial top wall 31, having an aperture 32 therein, a bottom wall 33, upright side walls 36 and a back wall 37. Member 30 has its front access opening bordered by an outwardly directed flange 38 along the top and sides thereof which normally fits in but may be slightly spaced from the indentation in the throat part of the oven opening. A portion of the lower front edge of liner 30 is cut away, as at 34, to prevent same striking door 25 when it is swung about mountings 26 in the presently disclosed geometric arrangement of a link and lever mechanism connection between the liner and door as will be hereinafter described. Spaced-apart embossations provided in upright side walls 36 of liner 30 receive a wire or the like shelf 39 for supporting roasting or other cooking receptacles thereon within oven 13. Any number of these embossations may be provided in liner 30 as is conventional to support one or more shelves 39 therein as desired and to permit vertical adjustment of the shelves therein. The single shelf 39 herein illustrated is slidably supported within liner 30, intermediate embossations therein, so as to be extensible therefrom while carried thereby and is removable from the liner. Walls of oven liner 30 are preferably coated with porcelain enamel to facilitate cleaning thereof without danger of damaging same. Aperture 32 in liner 30 and the aperture therein provided by cut-away portion 34 thereof permit convection currents of heated air, warmed by the heater element 22 and 23, within the liner and between same and chamber 13 while the vent 21 provides proper ventilation of oven 13 as is customary in electrically heated range or oven structures.

Figure 6:
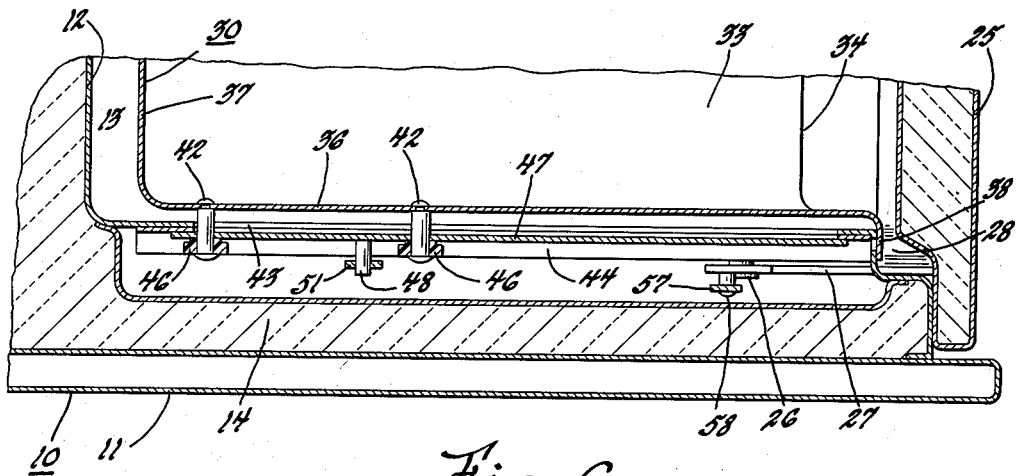
FIGURE 6 is a fragmentary sectional plan view taken on the line 6—6 of FIGURE 5 showing one side of the support of the liner in the oven front walls thereof.
Figure 4:
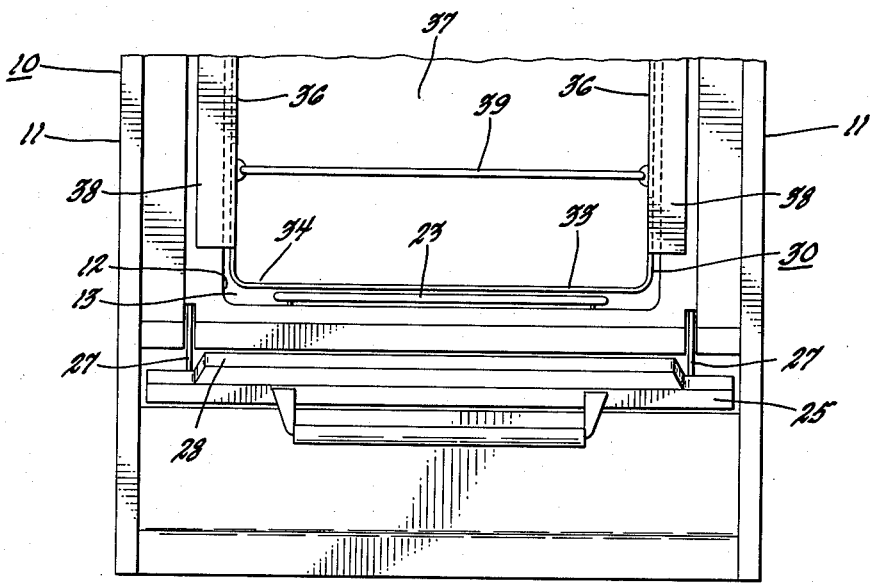
FIGURE 4 is a fragmentary front view showing the relationship of the opened oven door to front portions of the range cabinet.

In accordance with my invention the unitary box-like liner member 30 is supported in oven 13, with its walls extending continuously along and in close parallel relationship to walls of the oven shell 12, for horizontal straight-line gliding movement outwardly thereof or at least partway out of same while supported on its supports simultaneously with vertical swinging movement of oven door 25. The gliding of oven liner may, it is to be understood, be accomplished by a sliding or rolling action thereof relative to the oven shell 12 as desired. Liner 30 is preferably supported by two horizontally spaced-apart studs 42, welded or otherwise rigidly secured to each of the upright side walls 36 thereof which studs extend or pass through an elongated aperture 43 provided in each side of the oven shell 12 (see FIGURE 6). A spacing bushing preferably surrounds studs 42 between oven shell 12 and sides 36 of the wall-like liner 30 to maintain alignment of the liner with this shell and to prevent binding of the liner during its gliding movement. A channel-like track member 44 is welded upon each outer surface of shell 12 in parallel alignment with the elongated aperture 43 therein. Track member 44 has an elongated aperture therein corresponding to and aligned with aperture 43 through which the liner supporting studs 42 also extend. A roller 46 on each stud 42 is disposed intermediate and adapted to roll along outwardly directed tracks provided by flanges on the track member 44. The liner-supporting studs 42 pass through holes in a flat metal piece 47 which carries thereon a pin 48. Metal piece 47 ties the spaced-apart studs 42 to one another for movement with each other and is located between track member 44 and rollers 46 so as to close aperture 43 in oven shell 12 and the corresponding aperture in member 44 when oven door 25 is closed. The forward end of each movable metal piece 47 is adapted, as they are shifted outwardly of range or cabinet 10, to pass through a small rectangularly shaped aperture provided in each side of the front portion of oven shell 12 (see FIGURE 6) and which aperture is normally closed by flange 38 on liner 30. One end 51 of a bell crank lever (see FIGURE 7), fulcrumed on a stud 52 anchored to oven shell 12, is slotted as at 53 and receives the pin 48 secured to metal piece 47. The other end 54 of this bell crank lever is fastened, by a pin 56, to one end of a flat metal link 57 which has its opposite end fastened, by a pin 58, to a U-shaped side arm 27 on door 25 below hinge or pivot pin 26. A spring 61 has its one end fastened to a pin 62 carried on a side arm 27 of the door 25 and has its other end fastened to a pin 63 secured to oven shell 12 for counterbalancing swinging movements of the door. The pair of lever and link systems on each side of oven shell 12 described provide a tie means interposed between door 25 and oven liner 30 for connecting them to one another and causing simultaneous gliding of the liner, together with shelf 39, out of oven 13 upon swinging the door vertically about its pivotal or hinged mounting studs 26. In other words, the systems form force multiplying link and lever mechanisms or means for accomplishing objects of my invention. It is to be understood that while I disclose a cabinet or range, provided with my improvement, as being a free standing floor supported structure my invention is well applicable to built-in structures such as an oven supported in a cavity of a kitchen wall or the like.

Figure 7:
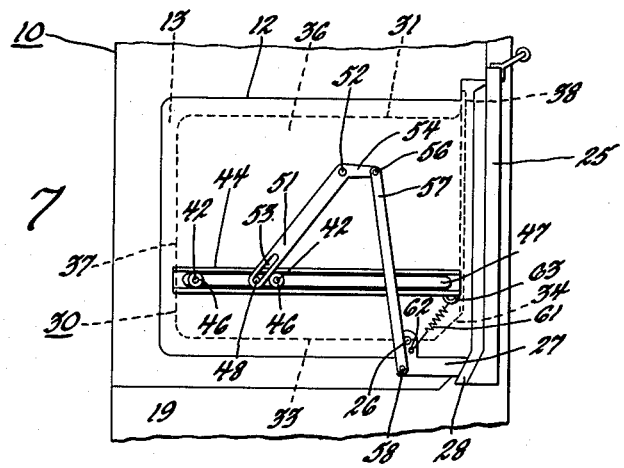
FIGURE 7 is a partly diagrammatic side elevational view illustrating a link and lever mechanism connecting the oven door to the oven liner.
Figure 9:
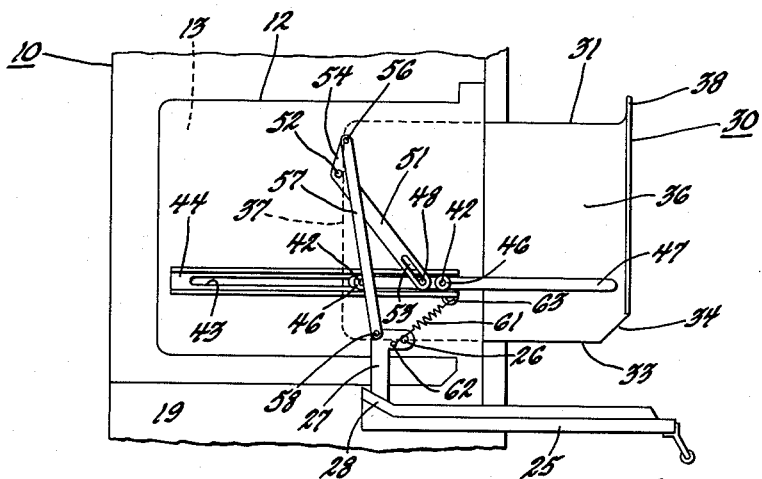
FIGURE 9 is a view similar to FIGURES 7 and 8 showing the position of the link and lever mechanism when the oven door is swung open with the oven liner glided outwardly of the oven.
Figure 8:
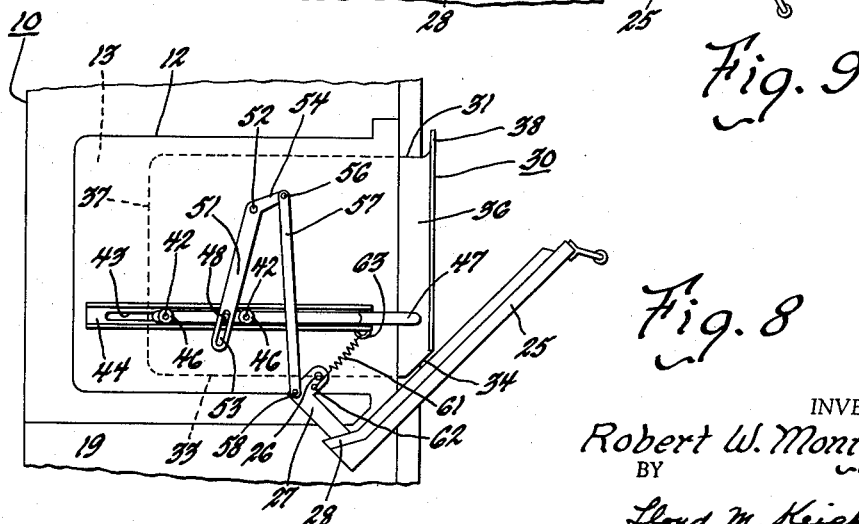
FIGURE 8 is a view similar to FIGURE 7 showing an initial movement of the link and lever mechanism and oven liner by swinging of the oven door about its pivotal mounting.

Having described the structural arrangement herein disclosed operation of elements thereof will now be explained in the course of useability of the oven. Assume that a roast or the like is being cooked in a roaster receptacle on shelf 39 within oven 13 with door 25 closed, as shown in FIGURES 1 and 2 of the drawings, and it is now desired to inspect or baste the roast or to place potatoes to be cooked in the receptacle with the roast. The housewife grasps the handle on the oven door and swings door 25 outwardly and downwardly with respect to cabinet 10 into the horizontal position thereof shown in FIGURES 3 and 9. This swinging movement of door 25 about its pivotal or hinged mounting 26 rotates the door around the front of the bottom wall of oven 13 and causes the lower part of the door to shift rearwardly relative to the front of cabinet 10 into the confine of walls of compartment 19. Door lip 28 and door extension or panel 29 shift with door 25 within and toward the rear of compartment 19 and panel 29 open the aperture in the compartment front wall thus permitting the door to enter the compartment. The force multiplying link and lever or connecting means between door 25 and oven liner 30 is responsive to and is actuated simultaneously with vertical swinging of the door. FIGURE 7 depicts the link and lever mechanism, employed to glide oven liner 30, in a normal position with door 25 closed; FIGURE 8 depicts the relationship of parts of the mechanism in a position when the oven door is partially opened; and FIGURE 9 depicts the position of parts of the mechanism when the oven door is fully opened. Thus when door 25 is swung open to its horizontal position, the link and lever mechanism glides the oven liner supports 42 forwardly and consequently liner 30 part-way out of oven 13 through its front opening until the forwardmost studs 42 engage the front end of the elongated aperture 43 in the oven shell 12. The spacing of hinged mounting 26 inwardly of the front of cabinet 10 rotates door 25 about the forward edge of the lower oven wall to position a part of the door below this wall with its normal top edge protruding forwardly of the cabinet front. It will be noted that the gliding of liner 30 out of access opening of oven 13 and the shifting movement of door 25 rearwardly into cabinet 10 (see FIGURES 3 and 9) causes approximately an equal protrusion of the front edge portion of liner 30 and the top edge of door 25 forwardly of the cabinet. This alignment of the outwardly glided oven liner 30 with the forward edge of the opened door 25 is advantageous in that a housewife may stand directly adjacent and in front of the extended liner, for access to the interior thereof, to inspect or baste a roast shifted out of oven 13 without the door forming a major or objectional obstruction in front of the glided linear. If a more readily access to the roast containing receptacle is desired, the housewife may pull forwardly on the extensible shelf 39, upon which the receptacle is located, to extend the receptacle outwardly of liner 30 while supported thereon and while the liner is part-way out of oven 13 and supported on its supports therein. In this fashion neither the liner 30 nor the projecting part of opened door 25 obstructs the housewife's access to the roast. When an inspection or basting of the roast has been finished, shelf 39 is returned or slid into liner 30 and door 25 is pulled upwardly and thence pushed rearwardly to close the oven opening. During this closing movement of door 25 the link and lever mechanism glides liner 30 back into its proper location within oven 13. The procedure just explained is also carried out when it is desired to clean the oven liner 30 and it is to be understood that with the liner glided part-way out of oven 13 access to all interior wall portions thereof may be readily had. By my invention a housewife is not confronted with the tedious task of detaching a soiled liner from a range oven and supporting or holding it stationary during cleaning of walls of the liner. Since the present oven liner is simultaneously glided out of the oven with opening swinging movements of its door soiled walls of the liner are visible and accessible at the end of each use of the oven. This creates ease in cleaning and inspires more frequent cleansing of soiled portions of walls of the liner to thereby prevent grease or other foreign matter deposited thereon or splashed or spilled out of a roaster receptacle onto same from hardening and becoming extremely difficult to thereafter be removed therefrom. The construction and operation of the presently disclosed arrangement provides an improved combination which facilitates use of an oven particularly at the front of a range and at all times renders an oven liner readily cleanable.

While the embodiment of the present invention as herein disclosed constitutes a preferred form, it is to be understood that other forms might be adopted.

What is claimed is as follows:

1. In combination:
   (a) a cabinet having walls defining an oven provided with a front opening and a compartment therein beneath said oven,
   (b) a single door hingedly mounted upon said cabinet for vertical swinging movement relative thereto normally closing the oven opening,
   (c) a heater element in said oven for heating the interior thereof,
   (d) a unitary member within said oven provided with walls paralleling walls thereof forming an inner liner therefor,
   (e) means supporting said liner in said oven for gliding movement relative thereto,
   (f) motion-transmitting means interposed between said door and said oven liner supporting means drivingly connecting the door to the liner,
   (g) said single door being swingable downwardly about its hinged mounting around the bottom wall of said oven into an open horizontal position adjacent the front thereof whereby a lower portion of the door shifts inwardly of the cabinet into said compartment below the oven and is concealed therein by walls of said cabinet, and
   (h) the swinging of said door causing said motion-transmitting means to glide said liner out of said oven through its opening while supported on said supporting means to align front edge portions of the outwardly glided liner substantially in the same vertical plane with the top edge of the single door protruding forwardly of said cabinet.

2. In combination:
   (a) a cabinet having walls defining an oven provided with a front opening and a compartment therein beyond and located in superimposed relationship with said oven,
   (b) a single door hingedly mounted upon said cabinet for vertical swinging movement relative thereto normally closing the oven opening,
   (c) a heater element in said oven for heating the interior thereof,
   (d) a unitary member within said oven provided with walls paralleling walls thereof forming an inner liner therefor,
   (e) means supporting said liner in said oven for gliding movement relative thereto,
   (f) motion-transmitting means interposed between said door and said oven liner supporting means drivingly connecting the door to the liner,
   (g) said single door being swingable about its hinged mounting around a wall of said oven into an open horizontal position adjacent the front thereof whereby a portion of the door shifts inwardly of the cabinet into said compartment beyond the oven and is concealed therein by walls of said cabinet, and
   (h) the swinging of said door causing said motion-transmitting means to glide said liner out of said oven through its opening while supported on said supporting means to align front edge portions of the outwardly glided liner substantially in the same vertical plane with the outer edge of the single door protruding forwardly of said cabinet.

3. In combination:
   (a) a cabinet having walls defining an oven provided with a front opening and a compartment therein beyond and located in superimposed relationship with said oven,
   (b) a single door hingedly mounted upon said cabinet for vertical swinging movement relative thereto normally closing the oven opening,
   (c) a heater element in said oven for heating the interior thereof,
   (d) an open front end box-like member within said oven provided with walls paralleling walls thereof forming an inner liner therefor,
   (e) means within the cabinet disposed outside walls of said oven supporting said liner therein for gliding movement relative thereto,
   (f) motion-transmitting means within walls of the cabinet also disposed outside walls of the oven interposed between said door and said oven liner supporting means drivingly connecting the door to the liner,
   (g) said single door being swingable about its hinged mounting around a wall of said oven into an open horizontal position adjacent the front thereof whereby a portion of the door shifts inwardly of the cabinet into said compartment beyond the oven and is concealed therein by walls of said cabinet,
   (h) the swinging of said door causing said motion-transmitting means to glide said liner out of said oven through its opening while supported on said supporting means to align said open front end of the outwardly glided box-like liner substantially in the same vertical plane with the outer edge of the door protruding forwardly of said cabinet, and
   (i) said box-like liner carrying a shelf therein which is extensible therefrom while carried thereby through the open front end thereof past said outer edge of said single protruding door when the liner is glided outwardly of said oven.

4. In combination:
   (a) a cabinet having walls defining an oven provided with a front opening and a compartment therein beneath said oven,
   (b) a single door hingedly mounted upon said cabinet for vertical swinging movement relative thereto normally closing the oven openng, (c) a heater element in said oven for heating the interior thereof, (d) an open front end box-like member within said oven provided with walls paralleling walls thereof forming an inner liner therefor, (e) means within the cabinet disposed outside walls of said oven supporting said liner therein for gliding movement relative thereto, (f) motion-transmitting means within walls of the cabinet also disposed outside walls of the oven interposed between said door and said oven liner supporting means drivingly connecting the door to the liner, (g) said single door being swingable downwardly about its hinged mounting around the bottom wall of said oven into an open horizontal position adjacent the front thereof whereby a lower portion of the door shifts inwardly of the cabinet into said compartment below the oven and is concealed therein by walls of said cabinet, (h) the swinging of said door causing said motion-transmitting means to glide said liner out of said oven through its opening while supported on said supporting means to align said open front end of the outwardly glided box-like liner substantially in the same vertical plane with the top edge of the door protruding forwardly of said cabinet, and (i) said box-like liner carrying a shelf therein which is extensible therefrom while carried thereby through its open front end above said single door and past the top edge thereof protruding forwardly of said cabinet.

References Cited in the file of this patent

UNITED STATES PATENTS

| | | |
|---|---|---|
| 741,704 | Ott | Oct. 20, 1903 |
| 889,236 | Janes | June 2, 1908 |
| 1,885,404 | Bamberg et al. | Nov. 1, 1932 |
| 1,970,343 | Sherman | Aug. 14, 1934 |
| 2,309,001 | Nave et al. | Jan. 19, 1943 |
| 2,535,379 | White | Dec. 26, 1950 |
| 2,654,117 | Pattison et al. | Oct. 6, 1953 |
| 2,912,559 | Kirschke | Nov. 10, 1959 |
| 2,944,139 | Harris et al. | July 5, 1960 |
| 2,997,041 | Wolske | Aug. 22, 1961 |
| 3,036,192 | Fry | May 22, 1962 |
| 3,036,193 | Allen | May 22, 1962 |

FOREIGN PATENTS

| | | |
|---|---|---|
| 1,017,310 | France | Sept. 17, 1952 |